A. W. COATES.
HORSE HAY-RAKE.
No. 184,840. Patented Nov. 28, 1876.
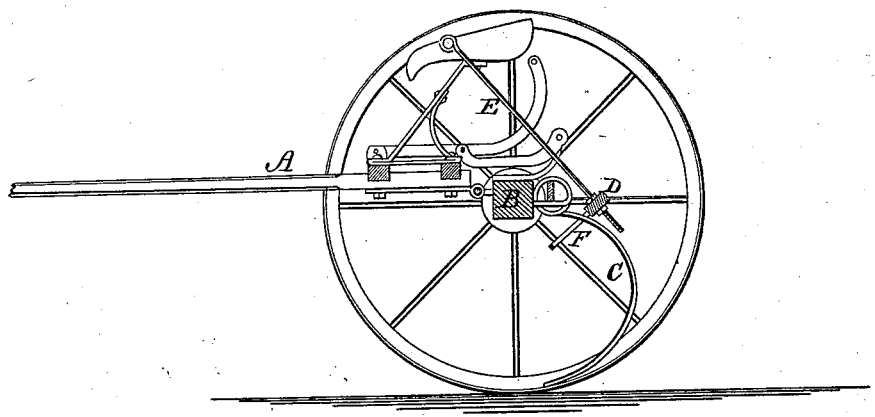
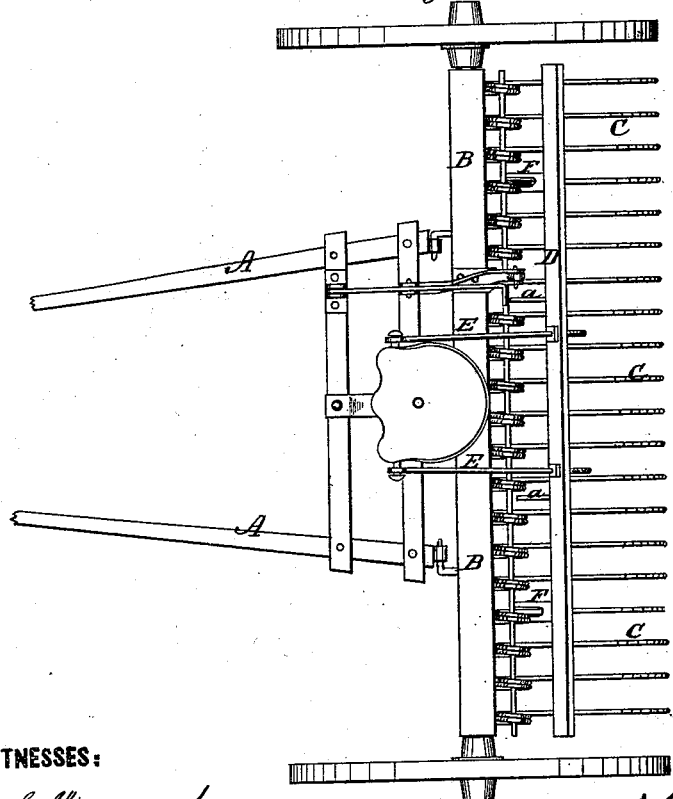
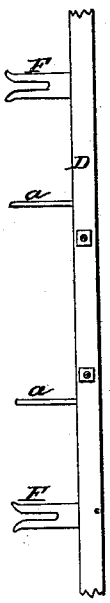
WITNESSES:
W. W. Hollingsworth
John C. Kenion
INVENTOR:
A. W. Coates
BY
[signature]
ATTORNEYS.

UNITED STATES PATENT OFFICE.

AMOS W. COATES, OF ALLIANCE, OHIO.

IMPROVEMENT IN HORSE HAY-RAKES.

Specification forming part of Letters Patent No. 184,840, dated November 28, 1876; application filed September 26, 1876.

*To all whom it may concern:*

Be it known that I, AMOS W. COATES, of Alliance, in the county of Stark and State of Ohio, have invented a new and Improved Horse Hay-Rake; and I do hereby declare that the following is a full, clear, and exact description of the same.

My invention relates to an improvement in clearers for horse hay-rakes, and is more particularly an improvement in that class of clearers which consist of a transverse bar resting upon the rake-teeth, and connected to each of them by staples or equivalent devices.

According to my improvement the clearer-bar is supported above the rake-teeth by means of forks, which bear upon but two of the latter, whereby certain advantages are secured in respect to wear and friction, ease of operation of the rake, and independent action of the wire teeth, as hereinafter described.

In the accompanying drawing, forming part of this specification, Figure 1 is a vertical section of my improved rake. Fig. 2 is a plan view thereof, and Fig. 3 represents a fragment of the clearer detached.

The shafts A are hinged to the axle B, and the spring-teeth C rigidly attached thereto, as usual in wire-tooth tilting rakes. The clearer-bar D is arranged transversely of the teeth C, and provided with fingers a, which project downward between the latter, and thus serve to remove the gathered hay from the teeth when the latter are tilted or elevated. The bar is pivoted to the driver's seat by means of rods E, as shown. Heretofore such clearer-bars have been allowed to rest upon all the wire teeth C, and have generally been connected thereto by a series of U-shaped staples, one for each tooth. One of the objections to this arrangement is, that the teeth are not allowed that independent action necessary to the performance of their function in the best manner, but each one is held down by the clearer-bar. Another objection is the friction and wear of the bar as it slides back on the teeth, when the latter are being raised. A third objection is, that the employment of U-shaped staples to connect the teeth to the clearer-bar prevents the latter being raised as high as the axle, by reason of the staples locking, as it were, with the teeth.

In my invention these objections are obviated. The clearer is supported above or out of contact with the rake-teeth by means of two forks, F, one being attached to each end of the bar. Each of the forks straddles a rake-tooth, and hence the clearer rests and is supported upon two of the rake-teeth instead of all, as heretofore, and the other teeth are thereby left individually free to yield to any obstruction, and at the same time the easy and effective operation of the clearer is not interfered with.

The forks likewise prevent the lateral play or movement of the clearer and contact of the same with the spokes of the wheels, which is the common result when a clearer is connected with the rake-teeth by means of staples.

Having thus described my invention, what I claim as new is—

The combination, with the clearer-bar and the rake-teeth, of the forks F, attached to the clearer-bar for the purpose of supporting the bar out of contact with all the teeth save those upon which the forks rest, in the manner shown and described.

AMOS W. COATES.

Witnesses:
MARTIN L. SEACRIST,
THOMAS J. SPIER.